(12) United States Patent
O'Hare et al.

(10) Patent No.: US 9,169,422 B2
(45) Date of Patent: Oct. 27, 2015

(54) METHOD OF COATING LIQUID OPTICALLY CLEAR ADHESIVES ONTO RIGID SUBSTRATES

(71) Applicant: 3M INNOVATIVE PROPERTIES COMPANY, St. Paul, MN (US)

(72) Inventors: Jonathan J. O'Hare, Oakdale, MN (US); Christopher J. Campbell, Burnsville, MN (US); Albert I. Everaerts, Oakdale, MN (US); Chin Teong Ong, Singapore (SG); Yi Lin Sim, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/347,058

(22) PCT Filed: Sep. 26, 2012

(86) PCT No.: PCT/US2012/057235
§ 371 (c)(1),
(2) Date: Mar. 25, 2014

(87) PCT Pub. No.: WO2013/049133
PCT Pub. Date: Apr. 4, 2013

(65) Prior Publication Data
US 2014/0234553 A1 Aug. 21, 2014

Related U.S. Application Data

(60) Provisional application No. 61/540,176, filed on Sep. 28, 2011, provisional application No. 61/540,337, filed on Sep. 28, 2011.

(51) Int. Cl.
*H01J 9/00* (2006.01)
*C09J 5/00* (2006.01)
(Continued)

(52) U.S. Cl.
CPC *C09J 5/00* (2013.01); *C09J 133/14* (2013.01); *G02B 5/0268* (2013.01)

(58) Field of Classification Search
CPC .................................. C09J 5/00; C09J 133/14
USPC ...................................................... 445/23–25
See application file for complete search history.

(56) References Cited

U.S. PATENT DOCUMENTS

| 5,867,241 A | 2/1999 | Sampica |
| 6,361,389 B1 | 3/2002 | Hogue |

(Continued)

FOREIGN PATENT DOCUMENTS

| CN | 101204696 | 6/2008 |
| JP | 11-128805 | 5/1999 |

(Continued)

OTHER PUBLICATIONS

Gilleo, "Screen Printing," (1989), pp. 128-132.
(Continued)

*Primary Examiner* — Joseph L Williams

(57) ABSTRACT

A method for making an optical assembly is disclosed. The method involves disposing a liquid optically clear composition with a coating head. The liquid optically clear composition is disposed onto a target substrate to form an optically clear adhesive layer for adhering elements in an optical assembly. The optical assembly includes a display panel bonded to another optical component and may be used in a display device.

23 Claims, 6 Drawing Sheets

(51) Int. Cl.
*C09J 133/14* (2006.01)
*G02B 5/02* (2006.01)

(56) References Cited

U.S. PATENT DOCUMENTS

| | | |
|---|---|---|
| 6,388,724 B1 | 5/2002 | Campbell |
| 6,540,833 B1 | 4/2003 | Gibson |
| 7,169,229 B2 | 1/2007 | Gibson |
| 7,344,665 B2 | 3/2008 | Pekurovsky |
| 7,894,757 B2 | 2/2011 | Matsuno |
| 2004/0080075 A1 | 4/2004 | Pekurovsky |
| 2006/0068113 A1 | 3/2006 | Aoyama |
| 2009/0194021 A1 | 8/2009 | Snodgrass |
| 2009/0215351 A1 | 8/2009 | Kobayashi |

FOREIGN PATENT DOCUMENTS

| | | |
|---|---|---|
| JP | 2000-51771 | 2/2000 |
| JP | 2001-137764 | 5/2001 |
| JP | 2007-152261 | 6/2007 |
| JP | 2007-167791 | 7/2007 |
| JP | 2010241951 | 10/2010 |
| WO | WO 2010-111316 | 9/2010 |
| WO | WO 2011-087983 | 7/2011 |
| WO | WO 2011-119180 | 9/2011 |
| WO | WO 2011-119828 | 9/2011 |
| WO | WO 2012-036980 | 3/2012 |

OTHER PUBLICATIONS

Gutoff, "Coating and Drying Defects: Troubleshooting Operating Problems," (2006) pp. 131-137.

International Search Report for PCT International No. PCT/US2012/057235 Mailed on Dec. 14, 2012, 3 pages.

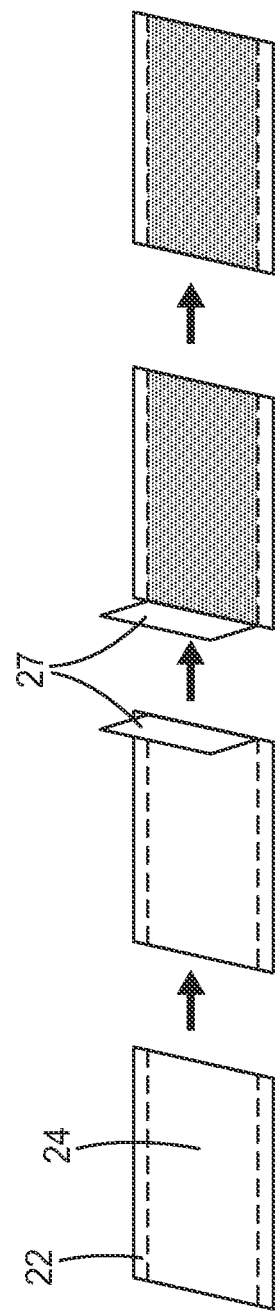

ponents in the display industry to fill the air gap between the optical elements. For example, LOCAs can fill the air gap between a coverglass and indium tin oxide (ITO) touch sensors, between ITO touch sensors and a liquid crystal module, or directly between the coverglass and the liquid crystal module.

METHOD OF COATING LIQUID OPTICALLY CLEAR ADHESIVES ONTO RIGID SUBSTRATES

TECHNICAL FIELD

The present invention is related generally to methods of coating liquid optically clear adhesives. In particular, the present invention is related to methods of coating liquid optically clear adhesives without the assistance of a printing aid. The method involves disposing the liquid optically clear composition with a coating head. The liquid optically clear adhesive is disposed on a target substrate to form an optically clear adhesive layer for adhering various elements in an optical assembly.

BACKGROUND

Optical bonding may be used to adhere together two optical elements using an optical grade adhesive. In display applications, optical bonding may be used to adhere together optical elements such as display panels, glass plates, touch panels, diffusers, rigid compensators, heaters, and flexible films such as polarizers and retarders. The optical performance of a display can be improved by minimizing the number of internal reflecting surfaces, thus it may be desirable to remove or at least minimize the number of air gaps between optical elements in the display.

Liquid optically clear adhesives (LOCA) are becoming more prevalent in the display industry to fill the air gap between the optical elements. For example, LOCAs can fill the air gap between a coverglass and indium tin oxide (ITO) touch sensors, between ITO touch sensors and a liquid crystal module, or directly between the coverglass and the liquid crystal module.

Current methods of applying LOCAs either involve a dispensable fluid or the patterning of a thicker, potentially thixotropic, material with the use of a stencil or screen. The use of dispensable fluids involves flowable liquid OCAs such that they behave like a Newtonian fluid. To prevent flow beyond the desired printing area, the use of a pre-cured dam material (matching the refractive index of the LOCA) is often required. This involves an additional process step, and may still potentially lead to overflow of the LOCA if a precise amount is not dispensed and/or there is not perfect coplanarity between the two substrates that are being bonded with the LOCA.

The use of a screen for printing a LOCA has been described in Kobayashi et al. (U.S. Patent Application Pub. No. 2009/0215351). The use of a stencil for printing a LOCA has been described in PCT International Pub. No. WO 2012/036980. Both methods require passing the LOCA through a screen or a stencil to achieve the adhesive coating in the desired area on the substrate.

SUMMARY

Methods of making an optical assembly are disclosed herein. In one embodiment, the method comprises: providing a display panel; providing a substantially transparent substrate; disposing a thixotropic, liquid optically clear composition with a coating head onto at least one of the display panel and the substrate; disposing the other of the display panel and the substrate on the liquid composition; and curing the liquid optically clear composition.

In one embodiment, an optically clear adhesive layer includes a liquid optically clear adhesive having a viscosity of less than about 20 Pa·s at a shear rate of 1 sec$^{-1}$ and a thixotrope. The optically clear adhesive layer has a haze of about 2% or less, a viscosity of between about 2 and about 30 Pa·s at a shear rate of 10 sec$^{-1}$, a displacement creep of about 0.2 radians or less when a stress of 10 Pa is applied for about 2 minutes and a recovery time of about 60 seconds or less to reach a delta of 35 degrees after a torque of about 1,000 µN·m is applied for about 60 seconds at a frequency of 1 Hz and immediately followed by a torque of 80 µN·m at a frequency of 1 Hz.

In another embodiment, an optical assembly comprising a display panel is disclosed herein. The optical assembly comprises: a display panel; a substantially transparent substrate; and an adhesive layer disposed between the display panel and the substantially transparent substrate.

The optical assembly disclosed herein may be used in an optical device comprising, for example, a handheld device comprising a display, a television, a computer monitor, a laptop display, or a digital sign.

In another embodiment, a method of making an optical assembly is disclosed. These and other aspects of the invention are described in the detailed description below. In no event should the above summary be construed as a limitation on the claimed subject matter that is defined solely by the claims as set forth herein.

BRIEF DESCRIPTION OF DRAWINGS

The present disclosure can be further described with reference to the following drawings, wherein:

FIG. 5 is a curtain coating method of the present disclosure of dispensing a LOCA.

These figures are idealized, are not drawn to scale and are intended merely for illustrative purposes.

DETAILED DESCRIPTION

Methods of coating LOCA onto a rigid substrate (e.g. coverglass, indium tin oxide (ITO) touch sensor stack, polarizer, liquid crystal module, etc.) without the assistance of a printing aid (e.g., a screen, a mask, a stencil, a pre-cured dam) are disclosed. The methods have been used for adhesive coating for web or film to make tape and film products or surface coating and have been found to provide a suitable method for printing liquid compositions onto a target substrate without ooze-out. In particular, it has been found that die coating methods, knife coating methods and curtain coating methods can be employed to dispose liquid optically clear compositions, such as adhesives, accurately and quickly in precision lamination applications involving gap filling between display panel and a cover substrate, such as applications involving the lamination of a glass panel onto a display panel in LCD displays, or the lamination of a touch sensitive panel onto a display panel in touch-sensitive electronic devices. The coating process enables significant improvements in throughput by enhancing cycle times and improving yields. The methods of the present invention can be used to coat a liquid optically clear adhesive onto a substrate without the use of a pattern or a printing aid, such as a stencil, screen, mask or dam.

Figure 1:
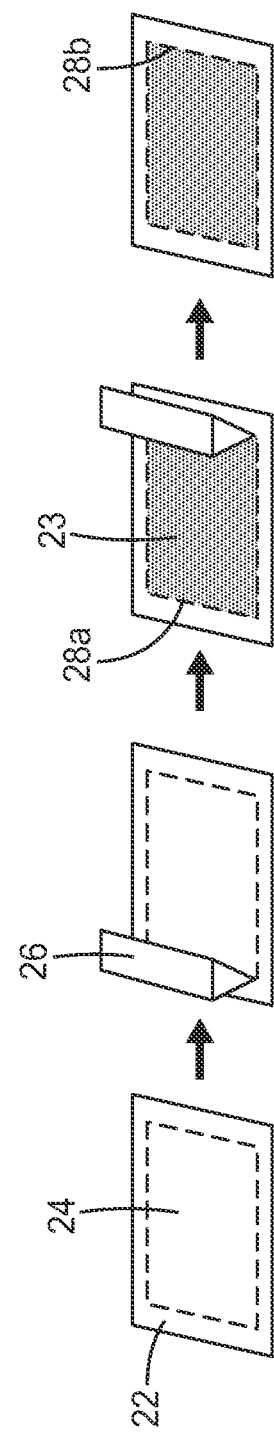
FIG. 1 is a first exemplary method of the present disclosure of dispensing a LOCA.

In FIG. 1, a substrate 22, to be coated, includes a coating region 24 and a coating edge surrounding the coating region.

The substrate is placed on a rigid platform (not shown) of a coating device. The coating device includes a coating head 26 that is positioned above the rigid platform. The coating head is mounted to a fixture that prevents sagging of the coating head. The fixture also has precise positioning, particularly with respect to the z-axis, to enable control of the height of the coating head relative to the substrate. In one embodiment, the z-axis position can be controlled to within about 0.002 inch (0.00508 cm), particularly to within about 0.001 inch (0.00254 cm), and more particularly to within about 0.0001 inch (0.000254 cm).

During the coating process, the coating head begins dispensing the LOCA 23 at a boundary of the coating edge 28*a* and the coating region 24 of the substrate 22. The coating head continues to dispense the LOCA at the same thickness across the coating region to the opposing coating edge 28*b*, as shown in FIG. 1. In one embodiment, the LOCA is dispensed to have a thickness of between about 1 μm and about 5 mm, particularly of between about 50 μm and about 1 mm, and more particularly between about 50 μm and about 0.3 mm.

In one embodiment, the rigid platform, and thus the substrate, moves relative to the coating head during the coating process. In another embodiment, the substrate is fixed while the coating head moves relative to the rigid platform during the coating process. At the end of the coating process and up through lamination to another substrate, the height and dimensional tolerance of the coated LOCA remain within certain dimensional tolerances. In one embodiment, the difference between the desired edge/boundary of the coated LOCA and the actual edge/boundary of the coated LOCA is less than about 2 mm, particularly less than about 0.8 mm, and more particularly less than about 0.5 mm. In one embodiment, the thickness over the entire coating region is within less than about 100 μm of the target coating thickness, particularly within less than about 50 μm of the target coating thickness, and more particularly within about 30 μm of the target coating thickness. In one embodiment, the substrate and the coating head move at a speed of between about 0.1 mm/s and about 3000 mm/s relative to one another, particularly between about 1 mm/s and about 1000 mm/s relative to one another, and more particularly between about 3 mm/s and about 500 mm/s relative to one another.

As shown in FIG. 1, the coating region is denoted with by the white dotted line, which represents the boundary between the coating edge and the coating region. The coating head is brought to the boundary of the coating edge and the coating region on the left side of the coating region, and begins to dispense the LOCA. Once the coating head reaches the end point at the right side of the coating region adjacent the coating edge, the coating head ceases to dispense the LOCA. The coating head is then removed with the LOCA remaining within the coating region. In one embodiment, there is less than about 18% flow of the LOCA into the surrounding coating edge, particularly less than about 5% flow of the LOCA into the surrounding coating edge and more particularly less than about 1% flow of the LOCA into the surrounding coating edge.

In one embodiment, the coating head includes a slot die. Slot die printing and coating methods, which have been used for adhesive coating for web or film to make tape and film products or surface coating, have been found to provide a suitable method for printing liquid compositions onto a target substrate. Slot dies can be employed to dispose liquid optically clear compositions, such as adhesives, accurately and quickly in precision lamination applications involving gap filling between display panel and a cover substrate, such as applications involving the lamination of a glass panel onto a display panel in LCD displays, or the lamination of a touch sensitive panel onto a display panel in touch-sensitive electronic devices.

An example of a slot die for dispensing a feed stream of a liquid composition is described in PCT International Pub. No. WO 2011/087983 filed by 3M Company. Such a slot die can be used to dispense liquid optically clear compositions onto a substrate.

Figure 2A:
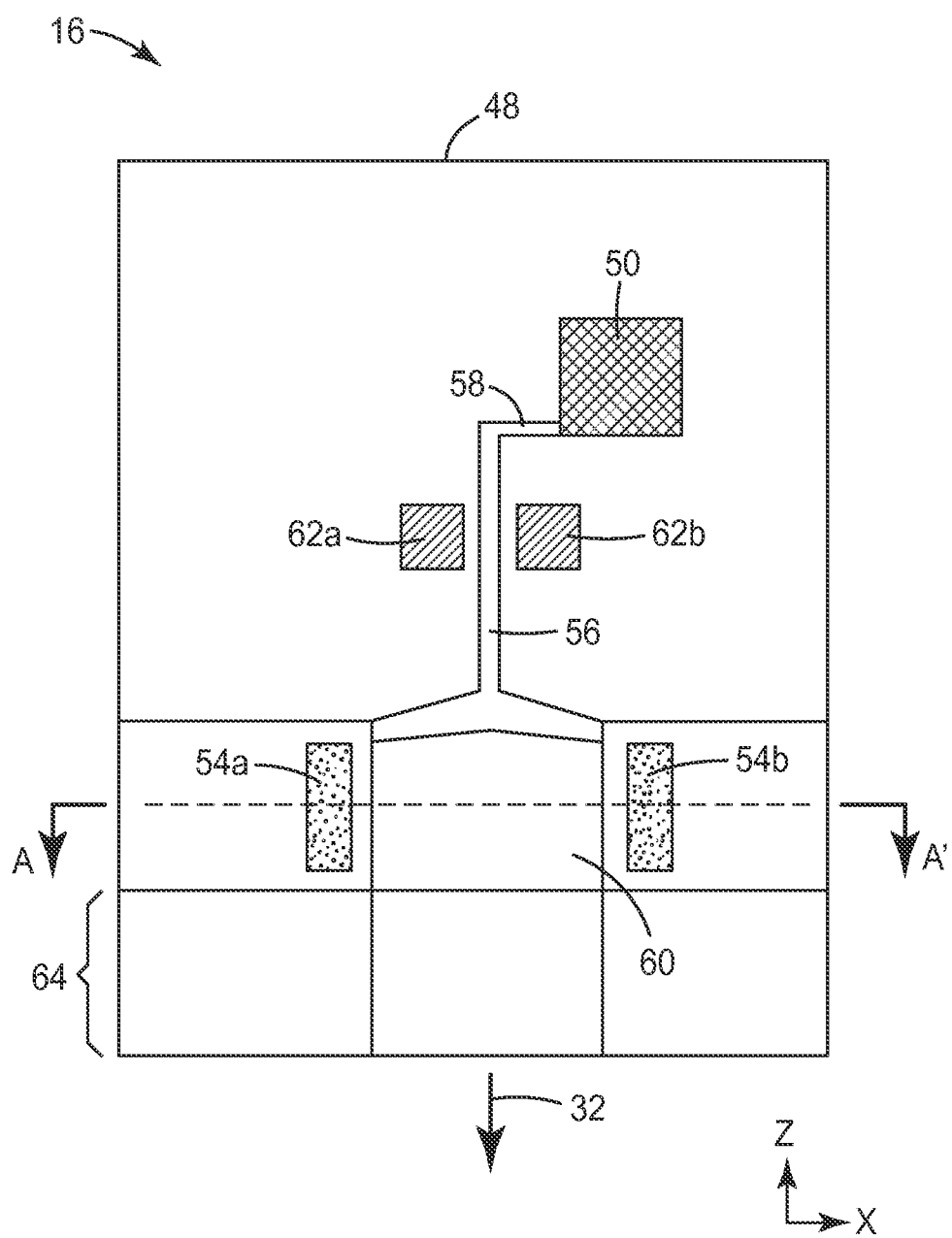
FIG. 2A is a schematic cross sectional view of a slot die.
Figure 2B:
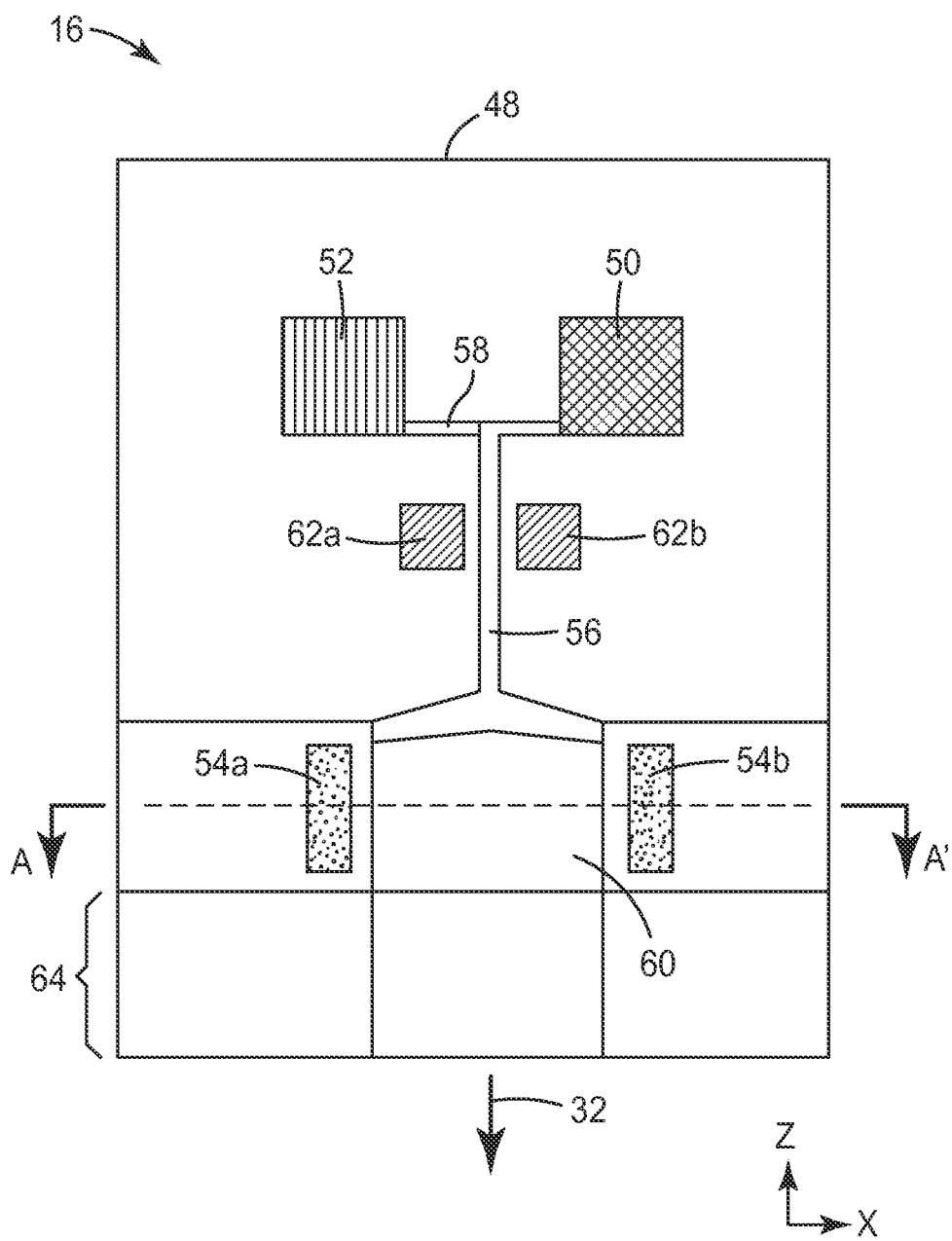
FIG. 2B is a schematic cross sectional view of a slot die.
Figure 3:
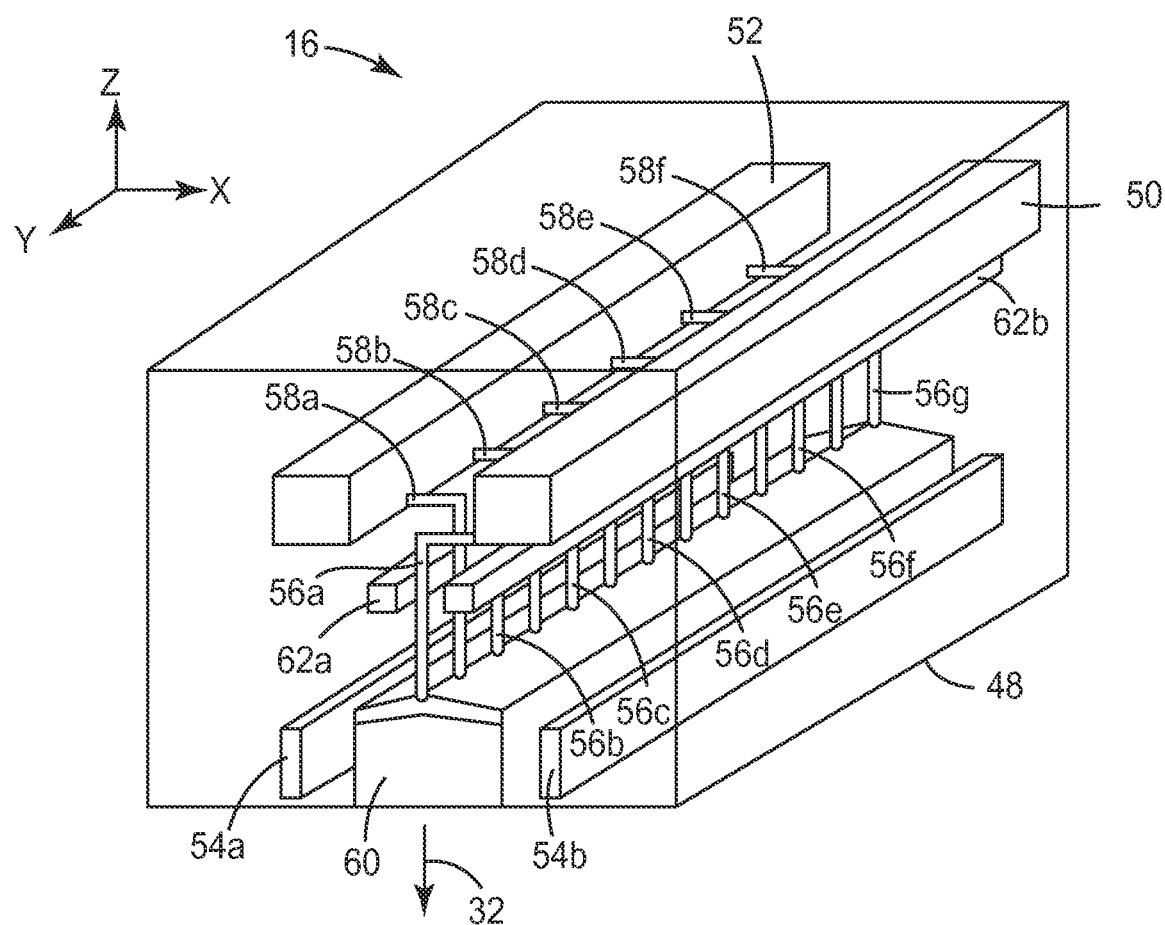
FIG. 3 is a perspective view of a slot die.

FIG. 2A, 2B and FIG. 3 are schematic diagrams illustrating an example slot die. Referring to FIG. 2A, feedblock 16 generates a flow stream 32 from a liquid composition present in first flow channel 50. A target substrate is placed under the feedblock 16. The slot die coating head is controlled by servo motor to move above substrate, while adhesive is pumped by a metering pump to dispense liquid composition from the slot die. The dispensing amount may be controlled by solenoid valves in the slot die.

A second flow channel may be provided to provide larger holding capacity for the liquid composition, or if it is desired to dispense two different liquid compositions simultaneously. An example is shown in FIG. 2B.

FIG. 3 shows a perspective view of a slot die having a first flow channel 50 and a second flow channel 52. Referring to FIG. 3, a plurality of first conduits 56*a*, 56*b*, 56*c*, 56*d*, 56*e*, 56*f*, 56*g* (collectively "first conduits 56") and a plurality of second conduits 58*a*, 58*b*, 58*c*, 58*d*, 58*e*, 58*f* (collectively "second conduits 58") are provided. Optionally, conduit heaters 62*a* and 62*b* (collectively "conduit heaters 62") and/or slot die heaters 54*a* and 54*b* (collectively, "slot die heaters 54"), may be provided within housing 48.

First flow channel 50 and second flow channel 52 are in fluid communication with extruders which supply a first and a second liquid composition feed stream (not shown) to the first and second flow channels 50, 52, respectively. First flow channel 50 is also in fluid communication with first conduits 56, and second flow channel 52 is also in fluid communication with second conduits 58. First liquid composition feed stream flows from within first flow channel 50 through first conduits 56 to slot die section 60 and liquid composition feed stream flow from within second flow channel 52 through second conduits 58 to slot die section 60. As illustrated in FIG. 3, first conduits 56 include seven individual first conduits 56*a*, 56*b*, 56*c*, 56*d*, 56*e*, 56*f*, 56*g* and second conduits 58 include six individual second conduits 58*a*, 58*b*, 58*c*, 58*d*, 58*e*, 58*f*. Where desired, each of the respective individual conduits may provide an individual polymer layer of a plurality of polymer layers in flow stream 32 generated via feedblock 16.

Figure 4:
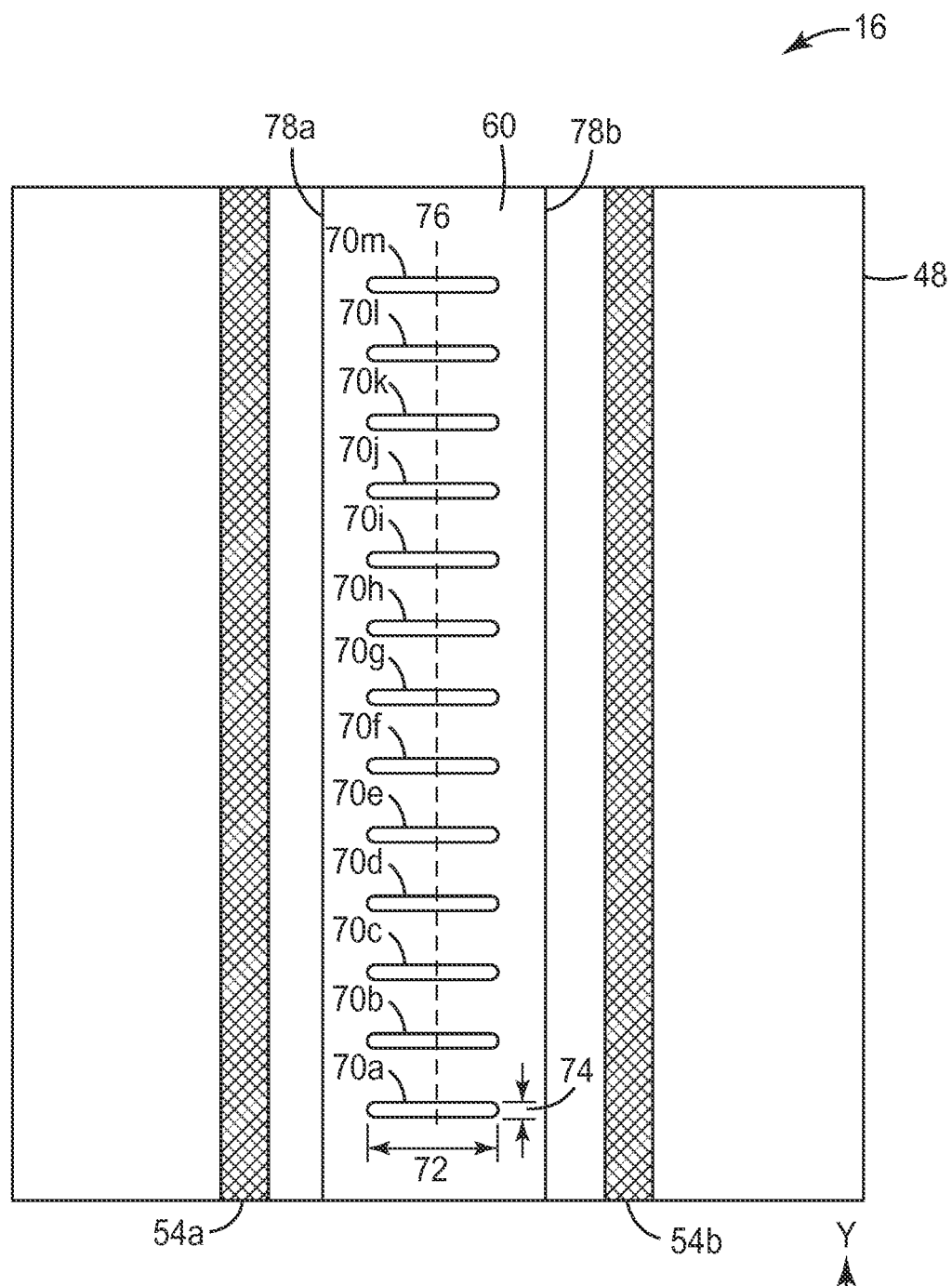
FIG. 4 is a bottom view of the slot die of FIG. 3.

Slot die section 60 includes a plurality of slots (shown in FIG. 4 as a plurality of slots 70*a* to 70*m*) that are in fluid communication with first conduits 56 and second conduits 58. First and second feed streams flow from first conduits 56 and second conduits 58, respectively, into slots 70 of slot die section 60. The flow of the respective melt streams are re-oriented within the slots 70 according to the flow dimensions of the slots 70. In some embodiments, slots 70 of slot die section 60 may include an expansion manifold section configured to receive one or more liquid compositions from the first and second plurality of conduits 56 and 58 and spread the liquid compositions in the width direction (x-direction) of slot die section 60 to approximately the desired width of flow stream 32 exiting feedblock 16.

Parameters such as slot height and/or length, conduit diameter, flow channel widths may be selected to provide for a desired layer thickness profile. For example, the cross-sectional area of flow channels 50 and 52 may be increased or decreased. It may be varied along its length to provide a certain pressure gradient that, in turn, may affect the layer thickness profile of multilayer flow stream 32. In this manner, the dimensions of one or more of the flow defining sections may be designed to influence the layer thickness distribution of the flow stream generated via feedblock 16, e.g., based on a target layer thickness profile.

In one embodiment, the coating head includes a slot fed knife die containing a converging channel. The geometry of the die could be a sharp lipped extrusion die or a slot fed knife with land on either or both the upstream and downstream lips of the die. A converging channel is preferred to avoid downweb ribbing and other coating defects. (See Coating and Drying Defects: Troubleshooting Operating Problems, E. B. Gutoff, E. D. Cohen, G. I. Kheboian, (John Wiley and Sons, 2006) pgs 131-137). Such coating defects could lead to mura and other noticeable optical defects in the display assembly.

To gain effective control of the amount of the LOCA dispensed at the boundary of the coating edge and coating region, pumping systems upstream of the coating head or elements within the coating head may be added to control the flow of the LOCA. This is often referred to as a "pre-metered" coating system. In one embodiment, a "pre-metered" coating system includes a dosing pump, such as a gear pump or a servo- or rod-driven positive displacement pump to control fluid flow. In one embodiment, the flow rate, Q, of the LOCA per unit width of the coating, W, is a function of the relative speed between the substrate and the coating head, U, and the targeted coating thickness, T. This function is represented by the equation: $Q/W=U\times T$, assuming 100% solids.

In one embodiment, the coating head contains at least one piston in the die to control the die opening and fluid flow. It is known in the art to provide an apparatus for coating a pattern of spaced discrete patches on the web of material by using a metering pump that supplies coating fluid to the internal cavity of an extrusion (or coating) die from a fluid reservoir. The dies may also include a piston alone or in combination with a pump that can be translated into or out of the cavity to control the flow of fluid out of the extrusion/coating die. Typically, by translating the piston into the cavity of the die, material is translated out of the die (e.g., onto a substrate). Translating the piston out of the cavity typically stops translation of the fluid out of the die. One example of this concept are ram dies wherein the driving force for expelling the material from the die is provided directly by a long, thin piston positioned along the internal cavity of the die and along its width. These types of coating apparatus may also utilize a diaphragm, clamped so as to change the volume within a draw-in chamber when directly attached to a piston.

In one embodiment, the coating head contains an integral bladder, similar to what is described in U.S. Pat. No. 7,344,665 (Mikhail et al.), to control the flow.

The coating head is built to handle pressures to shear the LOCA into the desired viscosity range. The LOCA dispensed through the coating head may optionally be pre-heated or heated in the coating head to lower the viscosity of the LOCA and aid the coating process.

In one embodiment, a vacuum box is used in conjunction with the coating head to ensure that air is not entrapped between the LOCA and the substrate and to stabilize the coating head. The vacuum box can also function to control excess LOCA from leaving the coating area by keeping the coating head within the intended coating width (e.g. the width of the shim).

In one embodiment, the coating head is a knife-coater, in which a sharp edge is used to meter the fluid onto the substrate. The coating thickness is determined by the gap between the knife and the substrate. The gap must be well controlled and is controlled in one embodiment to within about 0.002 inch (0.00508 cm), particularly to within about 0.001 inch (0.00254 cm), and more particularly to within about 0.0001 inch (0.000254 cm). An example of a knife-coater coating head includes, but is not limited to, a β COATER SNC-280 commercially available from Yasui-Seiki Co., Bloomington, Ind.

An appropriate liquid feed, for the LOCA, upstream of the knife is required. The liquid feed may include, but is not limited to: a syringe, needle die, hopper or a liquid dispensing manifold. The liquid feed is engaged to dispense enough liquid LOCA for a particular thickness over the coating area on the substrate (potentially through the use of a precision syringe pump).

In another embodiment, ultrasonic, high-pressure or air-assisted spraying is used to dispense the LOCA onto the substrate. Ultrasonic, high-pressure spraying provides a fine mist spray, reduces oversprays and has ultra-low flow rate capabilities. Air-assisted spraying prevents drifting of small droplets by using high-velocity air flow to aid the process of transporting droplets from the nozzle to the target. These spraying methods utilize a spray nozzle or an array of spray nozzles on a coating head. The spray nozzles are precision devices that facilitate dispersion of the LOCA into a spray. The spray may be intermittent or continuous. A suitable example includes, but is not limited to, the "EXACTACOAT SC" system available from Sono-tek Corp., Milton, N.Y.

In yet another embodiment, curtain coating could be used to apply the LOCA to the substrate, for example, if the substrate is coverglass. The curtain coating process creates an uninterrupted curtain LOCA that falls onto the substrate. The substrate is transported on the rigid platform, which acts as a conveyer belt, at a regulated speed through the curtain of LOCA located in a gap between two conveyors to ensure an even coat of the die. The curtain is created by a slit at the base of a LOCA holding tank that allows the LOCA to fall between the two conveyors upon the substrate. The thickness of the coating layer that falls upon the substrate is mainly determined by the speed of the rigid platform and the amount of material leaving the tank.

A stable curtain needs to be achieved with the LOCA using an appropriate dispensing die, such as those described above. In one embodiment, the curtain area is preferred to be at least a Class 1000, or more preferably at least a Class 100 type clean room area. This will ensure that the curtain area will be free of airborne particles or contaminants that would affect the optical properties of the coated area. The LOCA may either be re-circulated in a manner that would not entrain air or contaminants or may be discarded as waste. The substrate is passed through the LOCA curtain at a constant speed, either through the use of double conveyors. An example of suitable double conveyers includes air bearing conveyors, as commonly used in LCD manufacture. In one embodiment, the entire substrate is coated with the LOCA. In another embodiment, the substrate is positioned such that only a section of the substrate is coated with the LOCA, as shown in FIG. 5.

As illustrated in FIG. 5, a substrate 22 has a coating region 24, denoted with the imaginary boundary of the white dotted line. The substrate is passed through a curtain of the LOCA 27 and continues through the curtain in a direction normal to the plane that contains the curtain of LOCA. The substrate emerges, from the curtain of LOCA, uniformly coated.

The liquid optically clear adhesive used in the methods of the present invention are thixotropic in nature, exhibiting a solid like behavior at little to no shear (e.g. at least 500 Pa-s at $0.01\ s^{-1}$), while being flowable during the coating process when an appropriate amount of shear is applied (e.g. less than 50 Pa-s at $1\text{-}10\ s^{-1}$). The thixotropic LOCA regains its thixotropic properties within a certain time frame after the coating process to ensure that dimensional tolerances of the coating area are maintained. While a non-thixotropic liquid optically clear adhesive could be used (e.g. a highly viscous, 40 Pa-s Newtonian fluid), the next steps in the display assembly process (lamination, inspection, curing, etc.) would need to occur in a time window prior to the LOCA flowing beyond the desired coating area.

Suitable liquid compositions, particularly liquid optically clear compositions such as adhesives that are used in making optical assemblies, will be described in the following paragraphs.

Optical materials may be used to fill gaps between optical components or substrates of optical assemblies. Optical assemblies comprising a display panel bonded to an optical substrate may benefit if the gap between the two is filled with an optical material that matches or nearly matches the refractive indices of the panel and the substrate. For example, sunlight and ambient light reflection inherent between a display panel and an outer cover sheet may be reduced. Color gamut and contrast of the display panel can be improved under ambient conditions. Optical assemblies having a filled gap can also exhibit improved shock-resistance compared to the same assemblies having an air gap.

Optical materials used to fill gaps between optical components or substrates typically comprise adhesives and various types of cured polymeric compositions. However, these optical materials are not useful for making an optical assembly if, at a later time, one wishes to disassemble or rework the assembly with little or no damage to the components. This reworkability feature is needed for optical assemblies because the components tend to be fragile and expensive. For example, a cover sheet often needs to be removed from a display panel if flaws are observed during or after assembly or if the cover sheet is damaged after sale. It is desirable to rework the assembly by removing the cover sheet from the display panel with little or no damage to the components. Reworkability is becoming increasingly important as the size or area of available display panels continues to increase.

An optical assembly having a large size or area can be difficult to manufacture, especially if efficiency and stringent optical quality are desired. A gap between optical components may be filled by pouring or injecting a curable composition into the gap followed by curing the composition to bond the components together. However, these commonly used compositions have long flow-out times which contribute to inefficient manufacturing methods for large optical assemblies.

The optical assembly disclosed herein comprises an adhesive layer and optical components, particularly a display panel and a substantially light transmissive substrate. The adhesive layer allows one to rework the assembly with little or no damage to the components. The adhesive layer may have a cleavage strength between glass substrates of about 15 N/mm or less, 10 N/mm or less, or 6 N/mm or less, such that reworkability can be obtained with little or no damage to the components. Total energy to cleavage can be less than about 25 kg-mm over a 1 by 1 inch (2.54 by 2.54 cm) area.

The adhesive layer is suitable for optical applications. For example, the adhesive layer may have at least 85% transmission over the range of from 460 to 720 nm. The adhesive layer may have, per millimeter thickness, a transmission of greater than about 85% at 460 nm, greater than about 90% at 530 nm, and greater than about 90% at 670 nm. These transmission characteristics provide for uniform transmission of light across the visible region of the electromagnetic spectrum which is important to maintain the color point in full color displays.

The color portion of the transparency characteristics of the adhesive layer is further defined by its color coordinates as represented by the CIE L*a*b* convention. For example, the b* component of color should be less than about 1, more preferably less than about 0.5. These characteristics of b* provide for a low yellowness index which is important to maintain the color point in full color displays.

The haze portion of the transparency characteristics of the adhesive layer is further defined by the % haze value of the adhesive layer as measured by haze meters such as a Haze-Gard Plus available from Byk Gardner or an UltraScan Pro available from Hunter Labs. The optically clear article preferably has haze of the of less than about 5%, preferably less than about 2%, most preferably less than about 1%. These haze characteristics provide for low light scattering which is important to maintain the quality of the output in full color displays.

For reasons described above, the adhesive layer preferably has a refractive index that matches or closely matches that of the display panel and/or the substantially transparent substrate. The refractive index of the adhesive can be controlled by the proper choice of adhesive components. For example, the refractive index can be increased by incorporating oligomers, diluting monomers and the like which contain a higher content of aromatic structure or incorporate sulfur or halogens such as bromine. Conversely the refractive index can be adjusted to lower values by incorporating oligomer, diluting monomers and the like that contain a higher content of aliphatic structure. For example, the adhesive layer may have a refractive index of from about 1.4 to about 1.7.

The adhesive may remain transparent by the proper choice of adhesive components including oligomers, diluting monomers, fillers, plasticizers, tackifying resins, photoinitiators and any other component which contributes to the overall properties of the adhesive. In particular, the adhesive components should be compatible with each other, for example they should not phase separate before or after cure to the point where domain size and refractive index differences cause light scattering and haze to develop, unless haze is a desired outcome, such as for diffuse adhesive applications. In addition the adhesive components should be free of particles that do not dissolve in the adhesive formulation and are large enough to scatter light, and thereby contribute to haze. If haze is desired, such as in diffuse adhesive applications, this may be acceptable. In addition, various fillers such as thixotropic materials should be so well dispersed that they do not contribute to phase separation or light scattering which can contribute to a loss of light transmission and an increase in haze. Again, if haze is desired, such as in diffuse adhesive applications, this may be acceptable. These adhesive components also should not degrade the color characteristics of transparency by, for example, imparting color or increasing the b* or yellowness index of the adhesive layer.

The adhesive layer can be used in optical assembly comprising: a display panel; a substantially transparent substrate; and the adhesive layer disposed between the display panel and the substantially transparent substrate. The adhesive layer may have any thickness. The particular thickness employed in the optical assembly may be determined by any number of factors, for example, the design of the optical device in which the optical assembly is used may require a certain gap between the display panel and the substantially transparent substrate. The adhesive layer typically has a thickness of from about 1 µm to about 5 mm, from about 50 µm to about 1 mm, or from about 50 µm to about 0.2 mm.

The adhesive layer may be made using a liquid optically clear adhesive or liquid composition in combination with a thixotrope, wherein the liquid composition has a viscosity suitable for efficient manufacturing of large optical assemblies. A large optical assembly may have an area of from about 15 to about 5 m$^2$ or from about 15 cm$^2$ to about 1 m$^2$. For example, the liquid composition may have a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 sec$^{-1}$. The liquid composition is amenable for use in a variety of manufacturing methods. The adhesive layer can include any liquid optically clear adhesive having a viscosity such that when combined with a thixotrope, the adhesive layer has a viscosity of no more than 30 Pa·s, between about 2 and about 30 Pa·s and particularly between about 5 and about 20 Pa·s at a shear rate of 1 to 10 sec$^{-1}$. This range at 1-10 sec$^{-1}$ governs the ability of the adhesive layer to flow and sufficiently fill the desired coating area and to minimize the presence of air bubbles in the desired coating area. The range of 1-10 sec$^{-1}$ is the potential shear rate of the adhesive during the coating process, but there is potential for the adhesive to be coated at higher shear rates. At 0.01 sec$^{-1}$, the adhesive layer has a viscosity of at least 500 Pa·s, at least 2,000 Pa·s and preferably at least 10,000 Pa·s. The range at 0.01 sec$^{-1}$ defines when the adhesive layer has non-sag properties.

In one embodiment, the liquid optically clear adhesive used in the adhesive layer has a viscosity of about 20 Pa·s or less at a shear rate of 1-10 sec$^{-1}$. In particular, the liquid optically clear adhesive has a viscosity of about 10 Pa·s or less and more particularly about 5 Pa·s or less at a shear rate of 1-10 sec$^{-1}$. Within these ranges, the viscosity of the adhesive layer will be in the appropriate range when a thixotrope is added.

In one embodiment, the adhesive layer includes the reaction product of a multifunctional (meth)acrylate oligomer, a reactive diluent comprising a monofunctional (meth)acrylate monomer having a viscosity of from about 4 to about 20 cP at 25° C.; and a plasticizer. In general, (meth)acrylate refers to both acrylate and methacrylate functionality.

The multifunctional (meth)acrylate oligomer may comprise any one or more of: a multifunctional urethane(meth)acrylate oligomer, a multifunctional polyester(meth)acrylate oligomer, and a multifunctional polyether(meth)acrylate oligomer. The multifunctional (meth)acrylate oligomer may comprise at least two (meth)acrylate groups, e.g., from 2 to 4 (meth)acrylate groups, that participate in polymerization during curing. The adhesive layer may comprise from about 15 to about 50 wt %, from about 20 to about 60 wt %, or from about 20 to about 45 wt %, of the multifunctional (meth)acrylate oligomer. The particular multifunctional (meth)acrylate oligomer used, as well as the amount used, may depend on a variety of factors. For example, the particular oligomer and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 sec$^{-1}$. For another example, the particular oligomer and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 sec$^{-1}$ and the resulting adhesive layer has a Shore A hardness of less than about 30, less than about 20 or less than about 10. For yet another example, the particular oligomer and/or the amount thereof may be selected such that the adhesive composition is a liquid composition having a viscosity of up to about 140,000 cP for the composition at 25° C. and shear rate 1 sec$^{-1}$, and a viscosity of at least about 500,000 cP for the composition at 25° C. and shear rate 0.01 sec$^{-1}$.

The multifunctional (meth)acrylate oligomer may comprise a multifunctional urethane(meth)acrylate oligomer having at least two (meth)acrylate groups, e.g., from 2 to 4 (meth)acrylate groups, that participate in polymerization during curing. In general, these oligomers comprise the reaction product of a polyol with a multifunctional isocyanate, followed by termination with a hydroxy-functionalized (meth)acrylate. For example, the multifunctional urethane(meth)acrylate oligomer may be formed from an aliphatic polyester or polyether polyol prepared from condensation of a dicarboxylic acid, e.g., adipic acid or maleic acid, and an aliphatic diol, e.g. diethylene glycol or 1,6-hexane diol. In one embodiment, the polyester polyol comprises adipic acid and diethylene glycol. The multifunctional isocyanate may comprise methylene dicyclohexylisocyanate or 1,6-hexamethylene diisocyanate. The hydroxy-functionalized (meth)acrylate may comprise a hydroxyalkyl(meth)acrylate such as 2-hydroxyethyl acrylate, 2-hydroxypropyl(meth)acrylate, 4-hydroxybutyl acrylate, or polyethylene glycol(meth)acrylate. In one embodiment, the multifunctional urethane(meth)acrylate oligomer comprises the reaction product of a polyester polyol, methylene dicyclohexylisocyanate, and hydroxyethyl acrylate.

Useful multifunctional urethane(meth)acrylate oligomers include products that are commercially available. For example, the multifunctional aliphatic urethane(meth)acrylate oligomer may comprise urethane diacrylate CN9018, CN3108, and CN3211 available from Sartomer, Co., Exton, Pa., GENOMER 4188/EHA (blend of GENOMER 4188 with 2-ethylhexyl acrylate), GENOMER 4188/M22 (blend of GENOMER 4188 with GENOMER 1122 monomer), GENOMER 4256, and GENOMER 4269/M22 (blend of GENOMER 4269 and GENOMER 1122 monomer) available from Rahn USA Corp., Aurora Ill.; U-Pica 8966, 8967, 8967A and combinations thereof, available from Japan U-Pica Corp., and polyether urethane diacrylate BR-3042, BR-3641AA, BR-3741AB, and BR-344 available from Bomar Specialties Co., Torrington, Conn.

In general, the multifunctional urethane(meth)acrylate oligomer may be used in any amount depending on other components used to form the adhesive layer as well as the desired properties of the adhesive layer. The adhesive layer may comprise from about 15 to about 50 wt. %, from about 20 to about 60 wt. %, or from about 20 to about 45 wt. %, of the multifunctional urethane(meth)acrylate oligomer.

The multifunctional (meth)acrylate oligomer may comprise a multifunctional polyester(meth)acrylate oligomer. Useful multifunctional polyester acrylate oligomers include products that are commercially available. For example, the multifunctional polyester acrylate may comprise BE-211 available from Bomar Specialties Co. and CN2255 available from Sartomer Co.

The multifunctional (meth)acrylate oligomer may comprise a multifunctional polyether(meth)acrylate oligomer.

Useful multifunctional polyether acrylate oligomers include products that are commercially available. For example, the multifunctional polyether acrylate may comprise GENOMER 3414 available from Rahn USA Corp.

The reaction product that forms the adhesive layer is formed from a reactive diluent. The reactive diluent comprises a monofunctional (meth)acrylate monomer having a viscosity of from about 4 to about 20 cP at 25° C. The reactive diluent may comprise more than one monomer, for example, from two to five different monomers. Examples of these monomers include isobornyl acrylate, isobornyl(meth)acrylate, tetrahydrofurfuryl acrylate, tetrahydrofurfuryl methacrylate, alkoxylated tetrahydrofurfuryl acrylate, alkoxylated methacrylate, tetrahydrofurfuryl methacrylate and mixtures thereof. For example, the reactive diluent may comprise tetrahydrofurfuryl(meth)acrylate and isobornyl(meth)acrylate. For another example, the reactive diluent may comprise alkoxylated tetrahydrofurfuryl acrylate and isobornyl acrylate.

In general, the reactive diluent may be used in any amount depending on other components used to form the adhesive layer as well as the desired properties of the adhesive layer. The adhesive layer may comprise from about 15 to about 50 wt %, from about 30 to about 60 wt %, or from about 40 to about 60 wt %, of the reactive diluent, relative to the total weight of the adhesive layer.

The particular reactive diluent used, and the amount(s) of monomer(s) used, may depend on a variety of factors. For example, the particular monomer(s) and amount(s) thereof may be selected such that the adhesive composition is a liquid composition having a viscosity of from about 100 to 140,000 centipoise (cP), from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 $sec^{-1}$. For another example, the particular monomer(s) and amount(s) thereof may be selected such that the adhesive composition is a liquid composition having a viscosity of from about 100 to 140,000 cP, from about cP 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 $sec^{-1}$ and the resulting adhesive layer has a Shore A hardness of less than about 30, less than about 20 or less than about 10. For yet another example, the particular diluent and/or the amount thereof may be selected such that the adhesive composition is a liquid composition having a viscosity of up to about 140,000 cP for the composition at 25° C. and shear rate 1 $sec^{-1}$ and a viscosity of at least about 500,000 cP for the composition at 25° C. and shear rate 0.01 $sec^{-1}$. For yet another example, the particular diluent and/or the amount thereof may be selected such that the adhesive composition is a liquid composition having a viscosity of 18,000 to 140,000 cP for the composition at 25° C. and shear rate 1 $sec^{-1}$ and a viscosity of 700,000 to 4,200,000 cP for the composition at 25° C. and shear rate 0.01 $sec^{-1}$.

The adhesive layer comprises a plasticizer that increases its softness and flexibility. Plasticizers are well known and typically do not participate in polymerization of (meth)acrylate groups. The plasticizer may comprise more than one plasticizer material. The plasticizer may comprise oil. Suitable oils include vegetable oil, mineral oil and soybean oil. The adhesive layer may comprise from greater than 5 to about 20 wt %, or from greater than 5 to about 15 wt %, of the plasticizer. The particular plasticizer used, as well as the amount used, may depend on a variety of factors. For example, the particular plasticizer and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 $sec^{-1}$. For another example, the particular plasticizer and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 $sec^{-1}$ and the resulting adhesive layer has a Shore A hardness of less than about 30, less than about 20 or less than about 10. For yet another example, the particular plasticizer and/or the amount thereof may be selected such that the adhesive composition is a liquid composition having a viscosity of up to about 140,000 cP for the composition at 25° C. and shear rate of 1 $sec^{-1}$ and a viscosity of at least about 500,000 cP for the composition at 25° C. and shear rate 0.01 $sec^{-1}$. For yet another example, the particular diluent and/or the amount thereof may be selected such that the adhesive composition is a liquid composition having a viscosity of 18,000 cP to 140,000 cP for the composition at 25° C. and shear rate 1 $sec^{-1}$ and a viscosity of 700,000 cP to 4,200,000 cP for the composition at 25° C. and shear rate 0.01 $sec^{-1}$.

The reaction product that forms the adhesive layer may further comprise a monofunctional (meth)acrylate monomer having alkylene oxide functionality. This monofunctional (meth)acrylate monomer having alkylene oxide functionality may comprise more than one monomer. Alkylene functionality includes ethylene glycol and propylene glycol. The glycol functionality is comprised of units, and the monomer may have anywhere from 1 to 10 alkylene oxide units, from 1 to 8 alkylene oxide units, or from 4 to 6 alkylene oxide units. The monofunctional (meth)acrylate monomer having alkylene oxide functionality may comprise propylene glycol monoacrylate available as BISOMER PPA6 from Cognis Ltd. This monomer has 6 propylene glycol units. The monofunctional (meth)acrylate monomer having alkylene oxide functionality may comprise ethylene glycol monomethacrylate available as BISOMER MPEG350MA from Cognis Ltd. This monomer has on average 7.5 ethylene glycol units.

The adhesive layer may comprise from about 5 to about 30 wt. %, or from about 10 to about 20 wt. %, of the monofunctional (meth)acrylate monomer having alkylene oxide functionality. The particular monomer used, as well as the amount used, may depend on a variety of factors. For example, the particular monomer and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 $sec^{-1}$. For another example, the particular monomer and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 sec$^{-1}$ and the resulting adhesive layer has a Shore A hardness of less than about 30, less than about 20 or less than about 10. For yet another example, the particular monomer and/or the amount thereof may be selected such that the adhesive composition is a liquid composition having a viscosity of up to about 140,000 cP for the composition at 25° C. and shear rate 1 sec$^{-1}$ and a viscosity of at least about 500,000 cP for the composition at 25° C. and shear rate 0.01 sec$^{-1}$. For yet another example, the particular diluent and/or the amount thereof may be selected such that the adhesive composition is a liquid composition having a viscosity of 18,000 cP to 140,000 cP for the composition at 25° C. and shear rate 1 sec$^{-1}$ and a viscosity of 700,000 cP to 4,200,000 cP for the composition at 25° C. and shear rate 0.01 sec$^{-1}$.

The adhesive layer has little or no tackifier as described above. Tackifiers are typically used to increase the tackiness of an adhesive. The particular tackifier used, as well as the amount used, may depend on a variety of factors. The tackifier and/or the amount thereof may be selected such that the adhesive layer has a cleavage strength between glass substrates of about 15 N/mm or less, 10 N/mm or less, or 6 N/mm or less. The particular tackifier and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 sec$^{-1}$. For another example, the particular tackifier and/or the amount thereof may be selected such that the adhesive composition is a liquid composition having a viscosity of from about 100 to 140,000 cP, from about 100 to about 10,000 cP, from about 100 to about 5000 cP, from about 100 to about 1000 cP, from about 200 to about 700 cP, from about 200 to about 500 cP, or from about 500 to about 4000 cP, wherein viscosity is measured for the composition at 25° C. and 1 sec$^{-1}$ and the resulting adhesive layer has a Shore A hardness of less than about 30 less than about 20 or less than about 10. For yet another example, the particular tackifier and/or the amount thereof may be selected such that the adhesive composition is a liquid composition having a viscosity of up to about 140,000 cP for the composition at 25° C. and shear rate 1 sec$^{-1}$ and a viscosity of at least about 500,000 cP for the composition at 25° C. and shear rate 0.01 sec$^{-1}$. For yet another example, the particular diluent and/or the amount thereof may be selected such that the adhesive composition is a liquid composition having a viscosity of 18,000 cP to 140,000 cP for the composition at 25° C. and shear rate 1 sec$^{-1}$ and a viscosity of 700,000 cP to 4,200,000 cP for the composition at 25° C. and shear rate 0.01 sec$^{-1}$.

The adhesive layer may comprise: the reaction product of from about 15 to about 50 wt. % of the multifunctional (meth)acrylate oligomer, and from about 15 to about 50 wt. % of the reactive diluent; and from greater than 5 to about 25 wt. % of the plasticizer. The reaction product may further comprise from about 10 to about 20 wt. % of a monofunctional (meth)acrylate monomer having alkylene oxide functionality. This adhesive layer may comprise a glass-to-glass cleavage force less than about 15 N/mm, less than about 10 N/mm, or less than about 6 N/mm. The adhesive layer may comprise: the reaction product of from about 20 to about 60 wt. % of the multifunctional (meth)acrylate oligomer, and from about 30 to about 60 wt. % of the reactive diluent; and from greater than 5 to about 25 wt. % of the plasticizer. The reaction product may further comprise from about 10 to about 20 wt. % of a monofunctional (meth)acrylate monomer having alkylene oxide functionality. This adhesive layer may comprise a glass-to-glass cleavage force less than about 15 N/mm, less than about 10 N/mm, or less than about 6 N/mm. The adhesive layer may comprise: the reaction product of from about 25 to about 45 wt. % of the multifunctional (meth)acrylate oligomer, and from about 40 to about 60 wt. % of the reactive diluent; and from greater than 5 to about 15 wt. % of the plasticizer. The reaction product may further comprise from about 10 to about 20 wt. % of a monofunctional (meth)acrylate monomer having alkylene oxide functionality. The adhesive layer may comprise: the reaction product of from about 20 to about 50 wt. % of the multifunctional urethane (meth)acrylate oligomer, and from about 30 to about 60 wt. % of the reactive diluent; and from greater than 5 to about 25 wt. % of the plasticizer. The reaction product may further comprise from about 10 to about 20 wt. % of a monofunctional (meth)acrylate monomer having alkylene oxide functionality. The adhesive layer may comprise: the reaction product of from about 25 to about 45 wt. % of the multifunctional urethane(meth)acrylate oligomer, and from about 40 to about 60 wt. % of the reactive diluent; and from greater than 5 to about 15 wt. % of the plasticizer. The reaction product may further comprise from about 10 to about 20 wt. % of a monofunctional (meth)acrylate monomer having alkylene oxide functionality. The adhesive layer may comprise: the reaction product of from about 30 to about 60 wt. % of the multifunctional urethane(meth)acrylate oligomer, and from about 20 to about 30 wt. % of the reactive diluent; and from greater than 5 to about 10 wt. % of the plasticizer; from about 5 to about 10 wt. % of a monofunctional (meth)acrylate monomer having alkylene oxide functionality, and from about 2 to about 10 wt. % of fumed silica.

The optical assembly may comprise a display panel; a substantially transparent substrate; and an adhesive layer disposed between the display panel and the substantially transparent substrate, the adhesive layer comprising: the reaction product of a multifunctional (meth)acrylate oligomer; and a reactive diluent comprising a monofunctional (meth)acrylate monomer having a viscosity of from about 4 to about 20 cP at 25° C.; and a monofunctional (meth)acrylate monomer having alkylene oxide functionality.

The multifunctional (meth)acrylate oligomer comprises any one or more of a multifunctional urethane(meth)acrylate oligomer; a multifunctional polyester(meth)acrylate oligomer; and a multifunctional polyether(meth)acrylate oligomer.

The monofunctional (meth)acrylate monomer having a viscosity of from about 4 to about 20 cP at 25° C. may comprise a tetrahydrofurfuryl(meth)acrylate and isobornyl (meth)acrylate. The a tetrahydrofurfuryl(meth)acrylate may comprise an alkoxylated a tetrahydrofurfuryl acrylate The monofunctional (meth)acrylate monomer having alkylene oxide functionality may have from 1 to 10 alkylene oxide units.

The liquid optically clear composition may comprise the reaction product of from about 20 to about 60 wt % of the multifunctional (meth)acrylate oligomer; and from about 40 to about 80 wt % of the reactive diluent.

The optical assembly may comprise a display panel; a substantially transparent substrate; and an adhesive layer disposed between the display panel and the substantially transparent substrate, the adhesive layer comprising: the reaction product of a multifunctional rubber-based (meth)acrylate oligomer, and a monofunctional (meth)acrylate monomer having a pendant alkyl group of from 4 to 20 carbon atoms; and a liquid rubber.

The multifunctional rubber-based (meth)acrylate oligomer comprising any one or more of: a multifunctional polybutadiene(meth)acrylate oligomer, a multifunctional isoprene (meth)acrylate oligomer, and a multifunctional (meth)acrylate oligomer comprising a copolymer of butadiene and isoprene. The multifunctional rubber-based (meth)acrylate oligomer may comprise a multifunctional polybutadiene (meth)acrylate oligomer. The monofunctional (meth)acrylate monomer having a pendant alkyl group of from 4 to 20 carbon atoms may comprise a pendant group having from 8 to 20 carbon atoms. The liquid rubber may comprise liquid isoprene.

Useful multifunctional polybutadiene(meth)acrylate oligomers include the difunctional polybutadiene(meth)acrylate oligomer CN307 available from Sartomer Co. Useful multifunctional polyisoprene(meth)acrylate oligomers include the methacrylated isoprene oligomers UC-102 and UC-203 available from Kuraray America, Inc.

Useful monofunctional (meth)acrylate monomers having pendant alkyl groups of from 4 to 20 carbon atoms include 2-ethylhexyl acrylate, lauryl acrylate, isodecyl acrylate, and stearyl acrylate.

Liquid rubber may comprise LIR-30 liquid isoprene rubber and LIR-390 liquid butadiene/isoprene copolymer rubber available from Kuraray, Inc. and RICON 130 liquid polybutadiene rubber available from Sartomer Co., Inc.

The adhesive layer may further comprise a plasticizer as described above.

The adhesive layer may comprise: the reaction product of from about 20 to about 60 wt. % of the multifunctional rubber-based (meth)acrylate oligomer, and from about 20 to about 60 wt. % of the monofunctional (meth)acrylate monomer having a pendant alkyl group of from 4 to 20 carbon atoms; and from greater than 5 to about 25 wt. % of the liquid rubber.

The adhesive layer may comprise: the reaction product of from about 20 to about 50 wt. % of the multifunctional rubber-based (meth)acrylate oligomer, and from about 20 to about 50 wt. % of the monofunctional (meth)acrylate monomer having a pendant alkyl group of from 4 to 20 carbon atoms; and from greater than 5 to about 25 wt. % of the liquid rubber.

The adhesive layer comprises little or no tackifier as described above.

The adhesive layer may comprise tackifier. Tackifiers are well known and are used to increase the tack or other properties of an adhesive. There are many different types of tackifiers but nearly any tackifier can be classified as: a rosin resin derived from wood rosin, gum rosin or tall oil rosin; a hydrocarbon resin made from a petroleum based feedstock; or a terpene resin derived from terpene feedstocks of wood or certain fruits. The adhesive layer may comprise, e.g., from 0.01 to about 20 wt. %, from 0.01 to about 15 wt. %, or from 0.01 to about 10 wt. % of tackifier. The adhesive layer may be substantially free of tackifier comprising, e.g., from 0.01 to about 5 wt. % or from about 0.01 to about 0.5 wt. % of tackifier all relative to the total weight of the adhesive layer.

The adhesive layer may be free of tackifier. The adhesive layer may be soft, for example, the layer may have a Shore A hardness of less than about 30, less than about 20 or less than about 10.

The adhesive layer may exhibit little or no shrinkage, e.g., less than about 5%, depending on whatever amount is acceptable.

In another embodiment, the adhesive may be silicone based. For example the adhesive may be using addition curing chemistry between a silicon hydride functional silicone and a vinyl or allyl functional silicone. Addition curing silicones are well known in the art and they often incorporate platinum based catalysts that can be activated by heat or UV irradiation. Likewise two-component silicone liquid adhesives or gel forming materials may be used as the basis for this thixotropic, printable material. These types of silicones may rely on condensation chemistry and require heat to accelerate the curing mechanism.

In general, the adhesive layer may comprise metal oxide particles, for example, to modify the refractive index of the adhesive layer or the viscosity of the liquid adhesive composition (as described below). Metal oxide particles that are substantially transparent may be used. For example, a 1 mm thick disk of the metal oxide particles in an adhesive layer may absorb less than about 15% of the light incident on the disk. Examples of metal oxide particles include clay, Al2O3, ZrO2, TiO2, V2O5, ZnO, SnO2, ZnS, SiO2, and mixtures thereof, as well as other sufficiently transparent non-oxide ceramic materials. The metal oxide particles can be surface treated to improve dispersibility in the adhesive layer and the composition from which the layer is coated. Examples of surface treatment chemistries include silanes, siloxanes, carboxylic acids, phosphonic acids, zirconates, titanates, and the like. Techniques for applying such surface treatment chemistries are known. Organic fillers such as cellulose, castor-oil wax and polyamide-containing fillers may also be used.

In some embodiments, the adhesive layer comprises a fumed silica. Suitable fumed silicas include, but are not limited to: AEROSIL 200; and AEROSIL R805 (both available from Evonik Industries); CAB-O-SIL TS 610; and CAB-O-SIL T 5720 (both available from Cabot Corp.), and HDK H2ORH (available from Wacker Chemie AG).

In some embodiments, the adhesive layer comprises a fumed aluminum oxide, such as AEROXIDE ALU 130 (available from Evonik, Parsippany, N.J.).

In some embodiments, the adhesive layer comprises clay such as GARAMITE 1958 (available from Southern Clay Products).

Metal oxide particles may be used in an amount needed to produce the desired effect, for example, in an amount of from about 2 to about 10 wt. %, from about 3.5 to about 7 wt. %, from about 10 to about 85 wt. %, or from about 40 to about 85 wt. %, based on the total weight of the adhesive layer. Metal oxide particles may only be added to the extent that they do not add undesirable color, haze or transmission characteristics. Generally, the particles can have an average particle size of from about 1 nm to about 100 nm.

In some embodiments, the liquid optically clear adhesive comprises nonreactive oligomeric rheology modifiers. While not wishing to be bound by theory, non reactive oligomeric rheology modifiers build viscosity at low shear rates through hydrogen bonding or other self-associating mechanisms. Examples of suitable nonreactive oligomeric rheology modifiers include, but are not limited to: polyhydroxycarboxylic acid amides (such as BYK 405, available from Byk-Chemie GmbH, Wesel, Germany), polyhydroxycarboxylic acid esters (such as BYK R-606, available from Byk-Chemie GmbH, Wesel, Germany), modified ureas (such as DISPARLON 6100, DISPARLON 6200 or DISPARLON 6500 from King Industries, Norwalk, Conn. or BYK 410 from Byk-Chemie GmbH, Wesel, Germany), metal sulfonates (such as K-STAY 501 from King Industries, Norwalk, Conn. or IRCOGEL 903 from Lubrizol Advanced Materials, Cleveland, Ohio), acrylated oligoamines (such as GENOMER 5275 from Rahn USA Corp, Aurora, Ill.), polyacrylic acids (such as CARBOPOL 1620 from Lubrizol Advanced Materials, Cleveland, Ohio), modified urethanes (such as K-STAY 740 from King Industries, Norwalk, Conn.), or polyamides.

In some embodiments, non-reactive oligomeric rheology modifiers are chosen to be miscible and compatible with the optically clear adhesive to limit phase separation and minimize haze. In some embodiments, the adhesive layer may be formed from a thixotropic liquid optically clear adhesive. As used herein, a composition is considered thixotropic if the composition shear thins, i.e., viscosity decreases when the composition is subjected to a shearing stress over a given period of time with subsequent recovery or partial recovery of viscosity when the shearing stress is decreased or removed. Such adhesives exhibit little or no flow under zero or near-zero stress conditions. The advantage of the thixotropic property is that the adhesive can be dispensed easily by such processes as needle dispensing due to the rapid decrease in viscosity under low shear rate conditions. The main advantage of thixotropic behavior over simply high viscosity is that high viscosity adhesive is difficult to dispense and to flow during application. Adhesive compositions can be made thixotropic by adding particles to the compositions. In some embodiments, fumed silica is added to impart thixotropic properties to a liquid adhesive, in an amount of from about 2 to about 10 wt %, or from about 3.5 to about 7 wt %.

In some embodiments, any liquid optically clear adhesive having a viscosity of no more than 50 Pa·s, between about 2 and about 30 Pa·s and particularly between about 5 and about 20 Pa·s at a shear rate of 1 to 10 sec$^{-1}$ can be combined with a thixotropic agent to form a thixotropic liquid optically clear adhesive suitable for the coating process. The efficiency of the thixotropic agent and the optical properties depend on the composition of the liquid optically clear adhesive and its interaction with the thixotropic agent. For example, in the case of associative thixotropes or hydrophilic silica, the presence of highly polar monomers such as acrylic acid, acid or hyxdroxyl containing monomers or oligomers may disrupt the thixotropic or optical performance.

In some embodiments, the viscosities of the liquid optically clear adhesive may be controlled at two or more different shear rates. In one embodiment, the adhesive layer has a viscosity of between about 2 and about 50 Pa·s and particularly between about 5 and about 20 Pa·s at 25° C. and a shear rate of 10 sec$^{-1}$. In one embodiment, the adhesive layer has a viscosity of between about 500 and about 10,000 Pa·s and particularly between about 1,000 and about 8,000 Pa·s at 25° C. and a shear rate of 0.01 sec$^{-1}$. In one embodiment, the adhesive layer has a viscosity of between about 18 Pa·s and about 140 Pa·s and particularly between about 30 Pa·s and about 100 Pa·s at 25° C. and shear rate 1 sec$^{-1}$.

In some embodiments, the adhesive layer has a displacement creep of about 0.2 radians or less when a stress of 10 Pa is applied to the adhesive for 2 minutes. Particularly, the liquid optically clear adhesive has a displacement creep of about 0.1 radians or less when a stress of 10 Pa is applied to the adhesive for 2 minutes. In general, displacement creep is a value determined by using an AR2000 Rheometer manufactured by TA Instruments and a 40 mm diameter×1° cone at 25° C., and is defined as the rotational angle of the cone when a stress of 10 Pa is applied to the adhesive. The displacement creep is related to the ability of the thixotropic adhesive layer to resist flow, or sag, under very low stress conditions, such as gravity and surface tension.

In some embodiments, the liquid optically clear adhesive has a delta of 45 degrees or less, particularly 42 or less, particularly 35 degrees or less and more particularly 30 degrees or less when a torque of 80 microN·m is applied at a frequency of 1 Hz in a cone and plate rheometer. Delta is the phase lag between stress and strain where an oscillatory force (stress) is applied to a material and the resulting displacement (strain) is measured. Delta is assigned units of degrees. The delta is related to the "solid" behavior of the thixotropic adhesive layer or its non-sag property at very low oscillatory stress. The adhesive layer also has the ability to regain its non-sag structure within a short amount of time after passing underneath equipment, such as a squeegee in stencil printing applications. In one embodiment, the recovery time of the adhesive layer is less than about 60 seconds, particularly less than about 30 seconds, and more particularly less than about 10 seconds to reach a delta of 35 degrees after a torque of about 1000 microN·m is applied for about 60 seconds at a frequency of 1 Hz and immediately followed by a torque of 80 microN·m at a frequency of 1 Hz.

Photoinitiators may be used in the liquid compositions when curing with UV radiation. Photoinitiators for free radical curing include organic peroxides, azo compounds, quinines, nitro compounds, acyl halides, hydrazones, mercapto compounds, pyrylium compounds, imidazoles, chlorotriazines, benzoin, benzoin alkyl ethers, ketones, phenones, and the like. For example, the adhesive compositions may comprise ethyl-2,4,6-trimethylbenzoylphenylphosphinate available as LUCIRIN TPOL from BASF Corp. or 1-hydroxycyclohexyl phenyl ketone available as IRGACURE 184 from Ciba Specialty Chemicals. The photoinitiator is often used at a concentration of about 0.1 to 10 weight percent or 0.1 to 5 weight percent based on the weight of oligomeric and monomer material in the polymerizable composition.

The liquid compositions and adhesive layers can optionally include one or more additives such as chain transfer agents, antioxidants, stabilizers, fire retardants, viscosity modifying agents, antifoaming agents, antistatic agents and wetting agents. If color is required for the optical adhesive, colorants such as dyes and pigments, fluorescent dyes and pigments, phosphorescent dyes and pigments can be used.

The adhesive layers described above are formed by curing an adhesive composition or liquid composition. Any form of electromagnetic radiation may be used, for example, the liquid compositions may be cured using UV-radiation and/or heat. Electron beam radiation may also be used. The liquid compositions described above are said to be cured using actinic radiation, i.e., radiation that leads to the production of photochemical activity. For example, actinic radiation may comprise radiation of from about 250 to about 700 nm. Sources of actinic radiation include tungsten halogen lamps, xenon and mercury arc lamps, incandescent lamps, germicidal lamps, fluorescent lamps, lasers and light emitting diodes. UV-radiation can be supplied using a high intensity continuously emitting system such as those available from Fusion UV Systems.

In some embodiments, actinic radiation may be applied to a layer of the liquid composition such that the composition is partially polymerized. The liquid composition may be disposed between the display panel and the substantially transparent substrate and then partially polymerized. The liquid composition may be disposed on the display panel or the substantially transparent substrate and partially polymerized, then the other of the display panel and the substrate may be disposed on the partially polymerized layer.

In some embodiments, actinic radiation may be applied to a layer of the liquid composition such that the composition is completely or nearly completely polymerized. The liquid composition may be disposed between the display panel and the substantially transparent substrate and then completely or nearly completely polymerized. The liquid composition may be disposed on the display panel or the substantially transparent substrate and completely or nearly completely polymerized, then the other of the display panel and the substrate may be disposed on the polymerized layer.

In the assembly process, it is generally desirable to have a layer of the liquid composition that is substantially uniform. The two components are held securely in place. If desired, uniform pressure may be applied across the top of the assembly. If desired, the thickness of the layer may be controlled by a gasket, standoffs, shims, and/or spacers used to hold the components at a fixed distance to each other. Masking may be required to protect components from overflow. Trapped pockets of air may be prevented or eliminated by vacuum or other means. Radiation may then be applied to form the adhesive layer.

The optical assembly may be prepared by creating an air gap or cell between the two components and then disposing the liquid composition into the cell. An example of this method is described in U.S. Pat. No. 6,361,389 B1 (Hogue et. al) and includes adhering together the components at the periphery edges so that a seal along the periphery creates the air gap or cell. Adhering may be carried out using any type of adhesive, e.g., a bond tape such as a double-sided pressure sensitive adhesive tape, a gasket, an RTV seal, etc., as long as the adhesive does not interfere with reworkability as described above. Then, the liquid composition is poured into the cell through an opening at a periphery edge. Alternatively, the liquid composition is injected into the cell maybe using some pressurized injection means such as a syringe. Another opening is required to allow air to escape as the cell is filled. Exhaust means such as vacuum may be used to facilitate the process. Actinic radiation or heat may then be applied as described above to form the adhesive layer.

The optical assembly may be prepared using an assembly fixture such as the one described in U.S. Pat. No. 5,867,241 (Sampica et al.). In this method, a fixture comprising a flat plate with pins pressed into the flat plate is provided. The pins are positioned in a predetermined configuration to produce a pin field which corresponds to the dimensions of the display panel and of the component to be attached to the display panel. The pins are arranged such that when the display panel and the other components are lowered down into the pin field, each of the four corners of the display panel and other components is held in place by the pins. The fixture aids assembly and alignment of the components of an optical assembly with suitable control of alignment tolerances. Additional embodiments of this assembly method are described in Sampica et al. U.S. Pat. No. 6,388,724 B1 (Campbell, et. al) describes how standoffs, shims, and/or spacers may be used to hold components at a fixed distance to each other.

The display panel may comprise any type of panel such as a liquid crystal display panel. Liquid crystal display panels are well known and typically comprise a liquid crystal material disposed between two substantially transparent substrates such as glass or polymer substrates. As used herein, substantially transparent refers to a substrate that is suitable for optical applications, e.g., has at least 85% transmission over the range of from 460 to 720 nm. Optical substrates may have, per millimeter thickness, a transmission of greater than about 85% at 460 nm, greater than about 90% at 530 nm, and greater than about 90% at 670 nm. On the inner surfaces of the substantially transparent substrates are transparent electrically conductive materials that function as electrodes. In some cases, on the outer surfaces of the substantially transparent substrates are polarizing films that pass essentially only one polarization state of light. When a voltage is applied selectively across the electrodes, the liquid crystal material reorients to modify the polarization state of light, such that an image is created. The liquid crystal display panel may also comprise a liquid crystal material disposed between a thin film transistor array panel having a plurality of thin film transistors arranged in a matrix pattern and a common electrode panel having a common electrode.

The display panel may comprise a plasma display panel. Plasma display panels are well known and typically comprise an inert mixture of noble gases such as neon and xenon disposed in tiny cells located between two glass panels. Control circuitry charges electrodes within the panel which causes the gases to ionize and form a plasma, which then excites phosphors to emit light.

The display panel may comprise an organic electroluminescence panel. These panels are essentially a layer of an organic material disposed between two glass panels. The organic material may comprise an organic light emitting diode (OLED) or a polymer light emitting diode (PLED). These panels are well known.

The display panel may comprise an electrophoretic display. Electrophoretic displays are well known and are typically used in display technology referred to as electronic paper or e-paper. Electrophoretic displays comprise a liquid charged material disposed between two transparent electrode panels. Liquid charged material may comprise nanoparticles, dyes and charge agents suspended in a nonpolar hydrocarbon, or microcapsules filled with electrically charged particles suspended in a hydrocarbon material. The microcapsules may also be suspended in a layer of liquid polymer.

The substantially transparent substrate used in the optical assembly may comprise a variety of types and materials. The substantially transparent substrate is suitable for optical applications and typically has at least 85% transmission over the range of from 460 to 720 nm. The substantially transparent substrate may have, per millimeter thickness, a transmission of greater than about 85% at 460 nm, greater than about 90% at 530 nm, and greater than about 90% at 670 nm.

The substantially transparent substrate may comprise glass or polymer. Useful glasses include borosilicate, sodalime, and other glasses suitable for use in display applications as protective covers. One particular glass that may be used comprises EAGLE XG and JADE glass substrates available from Corning Inc. Useful polymers include polyester films such as polyethylene terephalate, polycarbonate films or plates, acrylic films such as polymethylmethacrylate films, and cycloolefin polymer films such as ZEONOX and ZEONOR available from Zeon Chemicals L.P. The substantially transparent substrate preferably has an index of refraction close to that of display panel and/or the adhesive layer; for example, from about 1.4 and about 1.7. The substantially transparent substrate typically has a thickness of from about 0.5 to about 5 mm.

The substantially transparent substrate may comprise a touch screen. Touch screens are well known and generally comprise a transparent conductive layer disposed between two substantially transparent substrates. For example, a touch screen may comprise indium tin oxide disposed between a glass substrate and a polymer substrate.

The optical assembly disclosed herein may be used in a variety of optical devices including, but not limited to, a handheld device such as a phone, a television, a computer monitor, a projector, a sign. The optical device may comprise a backlight.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

Test Methods

Viscosity Measurement

Viscosity measurements were made by using an AR2000 Rheometer equipped with a 40 mm, 1° stainless steel cone and plate from TA Instruments, New Castle, Del. Viscosities were measured using a steady state flow procedure with a frequency from 0.01 to 100 sec$^{-1}$ with a 28 µm gap between cone and plate at 25° C.

Materials

| Abbreviation or Trade Name | Description |
| --- | --- |
| Art Resin SSM7 | Urethane acrylate oligomer, available under the trade designation "ART RESIN SSM7" from Negami Chemical Industrial Co. Ltd.., Nomi-city, Japan |
| Bisomer PPA6 | Polypropylene glycol monoacrylate available under the trade designation "BISOMER PPA6" from Cognis Ltd., Southampton, UK. |
| SR489D | Tridecyl acrylate, available under the trade designation "SR489D" from Sartomer Co., Exton, PA. |
| BEHA | Bis(2-ethylhexyl) adipate, a plasticizer, available from Solutia, Inc., St. Louis. Missouri |
| Pinecrystal KE-311 | hydrogenated rosin ester, available under the trade designation "PINECRYSTAL KE-311" from Arakawa Chemical Ind., Ltd., Osaka, Japan. |
| Irganox 1076 | Stabilizer, available under the trade designation "IRGANOX 1076" from BASF Corp., Florham Park, New Jersey. |
| Silquest A174 | Methacryloxypropyltrimethoxy silane, available under the trade designation "SILQUEST A174" from Momentive Performance Materials, Albany, New York. |
| AO503 | Bis(tridecyl) 3,3'-thiodipropionate available under the trade designation "AO503" from Adeka Corp., Tokyo, Japan. |
| Aerosil 200 | Fumed silica, available under the trade designation "AEROSIL 200" from Evonik Industries, Parsippany, New Jersey |
| Lucirin TPO-L | 2,4,6-Trimethylbenzoylethoxyphenylphosphine oxide available under the trade designation "LUCIRIN TPO-L" from BASF Corp. |

Process Examples

Example 1

A liquid optically clear adhesive composition (labeled as "LOCA-1") was prepared by mixing, on a weight basis, 59.02 parts Art Resin SSM7, 2.74 parts Bisomer PPA6, 6.35 parts SR489D, 9.08 parts BEHA, 13.62 parts Pinecrystal KE-311, 0.9 parts Irganox 1076, 0.49 parts Silquest A174, 0.9 parts AO503, 5.91 parts Aerosil 200 and 0.99 parts Lucirin TPO-L in a high shear mixer. The viscosity of LOCA-1, at various shear rates, is shown in Table 1.

TABLE 1

Viscosity of LOCA-1 at 25° C.

| Shear Rate (s$^{-1}$) | Viscosity (Pa-s) |
| --- | --- |
| 0.01 | 2,053 |
| 0.1 | 852.6 |
| 1 | 115.1 |
| 10 | 28.5 |
| 100 | 14.1 |

LOCA-1 was curtain coated onto a 3 inch (7.6 cm)×2 inch (5.1 cm)×0.06 inch (0.15 mm) glass plate by the following procedure. A 12.5 inch (31.8 cm) wide, sharp lipped, extrusion slot die, configured to be in the vertical drop position, was fitted with a 0.020 inch (0.051 cm) shim that narrowed the die opening to a width of about 5 inches (12.7 cm). Two wooden dowels were used as "side-limiters" to stabilize the edges of the curtain coating. The dowels were taped to the die such that, during the coating process, the edge of the fluid curtain just touched the dowel surface and then ran down the edge of the dowels. The die was connected to a pressure pot. The pressure pot contained a small container, having an inside diameter of about 1.625 inch (4.128 cm) and a total volume of about 8 ounces (237 cm$^3$), the container holding LOCA-1. The pressure pot outlet, polyethylene tubing having a 0.25 inch (0.64 cm) inside diameter, was submerged in LOCA-1. The pot was sealed and pressurized to 30 psi (207 kPa) using compressed air, causing LOCA-1 to be extruded from the die and forming a 5 inch wide fluid curtain. The glass plate was fed under the fluid curtain by hand at a rate of about 0.15 inch/sec (0.38 cm/sec). After coating, LOCA-1 was cured by running the coated plate through a UV curing system (Model MC-6RQN; available from Fusion UV Systems Inc., Gaithersburg, Md.), seven times at a conveyor speed of 15 feet per minute (4.6 meter per minute) in a nitrogen purged environment (purged to approximately 50 ppm oxygen), and having an H-bulb operating at 200 watts/inch.

Example 2

A Nordson TrueCoat™ slot applicator was selected for the example. A target substrate was placed under the applicator, which had been loaded with LOCA-1. The applicator was mounted on a frame capable of moving the applicator. Movement of the applicator above substrate was controlled by an electro pneumatic servo motor. Adhesive quantity was pumped by metering pump to supply into slot die and dispensing amount was controlled by solenoid valves in slot die coating head. The moving speed of the slot die was controllable between about 0.1 to 50 mm/sec. The application width of the slot die was about 500 mm. It is understood that application width can be varied between about 50 to 1000 mm. Gap between slot die and target substrate was at about 1 mm. After adhesive was disposed onto the target substrate, planarity was checked. Planarity tolerance of ±35 microns was achieved for 300 micron adhesive coating thickness.

Example 3

The same Nordson TrueCoat™ slot applicator was selected for the example. A target substrate was placed under the applicator, which was loaded with LOCA-1. The applicator was mounted on a frame capable of moving the applicator. Movement of the applicator above substrate was controlled by an electro pneumatic servo motor. Adhesive quantity was pumped by metering pump to supply into slot die and dispensing amount was controlled by solenoid valves in slot die coating head. The moving speed of the slot die was controllable between about 0.1 to 50 mm/sec. The application width of the slot die was about 500 mm. Gap between slot die and target substrate was at about 5 mm. After adhesive was disposed onto the target substrate, planarity was checked. A similar planarity tolerance of ±35 microns was achieved for 300 micron adhesive coating thickness.

The invention claimed is:

1. A method of making an optical assembly, comprising:
   providing a display panel;
   providing a substantially transparent substrate;
   disposing a thixotropic liquid optically clear composition with a coating head onto at least one of the display panel and the substrate;
   disposing the other of the display panel and the substrate on the liquid composition; and
   curing the liquid optically clear composition.

2. The method claim 1 further comprising a pre-metered coating system wherein the pre-metered coating system is selected from dosing pump, gear pump and positive displacement pump.

3. The method of claim 2 wherein the positive displacement pump is selected from servo-driven displacement pump and rod-driven displacement pump.

4. The method of claim 1 wherein the coating head is a die.

5. The method of claim 4 wherein the die has at least one piston.

6. The method of claim 4 wherein the die is a slot die.

7. The method of claim 6 wherein the geometry of the slot die is selected from a sharp lipped extrusion die and a slot fed knife die with a land.

8. The method of claim 1, wherein the liquid optically clear composition comprises:
   the reaction product of:
      a multifunctional (meth)acrylate oligomer; and
      a reactive diluent comprising a monofunctional (meth)acrylate monomer having a viscosity of from about 4 to about 20 cP at 25° C.; and
   a plasticizer.

9. The method of claim 8, wherein the multifunctional (meth)acrylate oligomer comprises any one or more of:
   a multifunctional urethane(meth)acrylate oligomer;
   a multifunctional polyester(meth)acrylate oligomer; and
   a multifunctional polyether(meth)acrylate oligomer.

10. The method of claim 8, wherein the monofunctional (meth)acrylate monomer comprises a tetrahydrofurfuryl (meth)acrylate and isobornyl(meth)acrylate.

11. The method of claim 8, wherein the liquid optically clear composition comprises:
   the reaction product of:
      from about 20 to about 60 wt. % of the multifunctional (meth)acrylate oligomer; and
      from about 30 to about 60 wt. % of the reactive diluent; and
      from greater than about 5 to about 25 wt. % of the plasticizer.

12. The method of claim 1, wherein the liquid optically clear composition comprises:
   the reaction product of:
      a multifunctional (meth)acrylate oligomer; and
      a reactive diluent comprising a monofunctional (meth)acrylate monomer having a viscosity of from about 4 to about 20 cP at 25° C.; and
   a monofunctional (meth)acrylate monomer having alkylene oxide functionality.

13. The method of claim 12, wherein the multifunctional (meth)acrylate oligomer comprises any one or more of:
   a multifunctional urethane(meth)acrylate oligomer;
   a multifunctional polyester(meth)acrylate oligomer; and
   a multifunctional polyether(meth)acrylate oligomer.

14. The method of claim 12, wherein the monofunctional (meth)acrylate monomer having a viscosity of from about 4 to about 20 cP at 25° C. comprises a tetrahydrofurfuryl(meth)acrylate and isobornyl(meth)acrylate, and wherein the monofunctional (meth)acrylate monomer having alkylene oxide functionality has from 1 to 10 alkylene oxide units.

15. The method of claim 12, wherein the liquid optically clear composition comprises the reaction product of:
   from about 20 to about 60 wt. % of the multifunctional (meth)acrylate oligomer; and
   from about 40 to about 80 wt. % of the reactive diluent.

16. The method of claim 1, wherein the liquid optically clear composition comprises:
   the reaction product of:
      a multifunctional rubber-based (meth)acrylate oligomer; and
      a monofunctional (meth)acrylate monomer having a pendant alkyl group of from about 4 to 20 carbon atoms; and
   a liquid rubber.

17. The method of claim 16, wherein the multifunctional rubber-based (meth)acrylate oligomer comprises any one or more of:
   a multifunctional polybutadiene(meth)acrylate oligomer;
   a multifunctional isoprene(meth)acrylate oligomer; and
   a multifunctional (meth)acrylate oligomer comprising a copolymer of butadiene and isoprene.

18. The method of claim 16, wherein the multifunctional rubber-based (meth)acrylate oligomer comprises a multifunctional polybutadiene(meth)acrylate oligomer.

19. The method of claim 16, wherein the liquid rubber comprises liquid isoprene.

20. The method of claim 16, wherein the liquid optically clear composition comprises:
   the reaction product of:
      from about 20 to about 60 wt. % of the multifunctional rubber based (meth)acrylate oligomer; and
      from about 20 to about 60 wt. % of the monofunctional (meth)acrylate monomer having a pendant alkyl group of from 4 to 20 carbon atoms; and
      from greater than about 5 to about 25 wt. % of the liquid rubber.

21. The method of claim 1, wherein the liquid optically clear composition comprises silica.

22. The method of claim 1, wherein the liquid optically clear composition is deposited to form a layer having a thickness of from about 1 μm to about 5 mm.

23. The method of claim 1, further comprising curing the liquid optically clear composition by applying actinic radiation.

* * * * *